Nov. 15, 1949    I. L. PRESSMAN    2,487,944
TEMPLATE
Filed Feb. 12, 1945    2 Sheets-Sheet 1
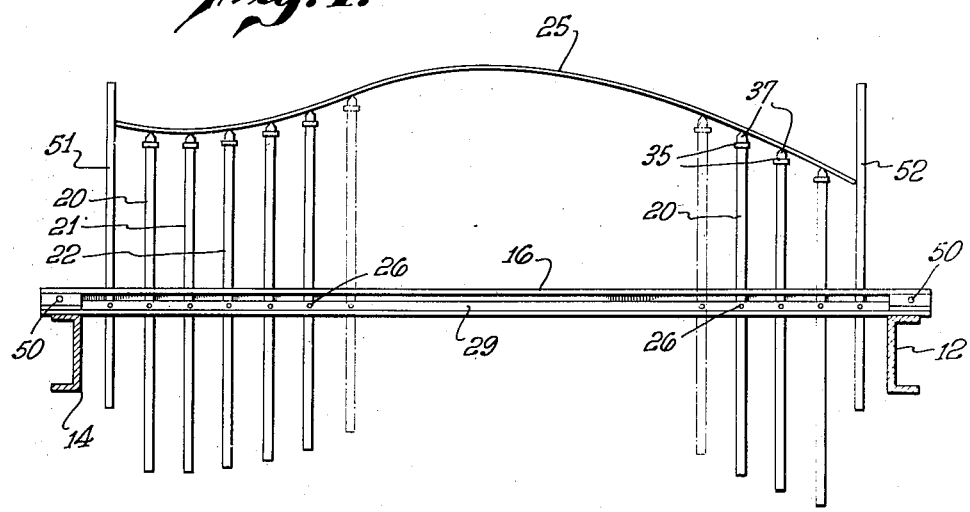
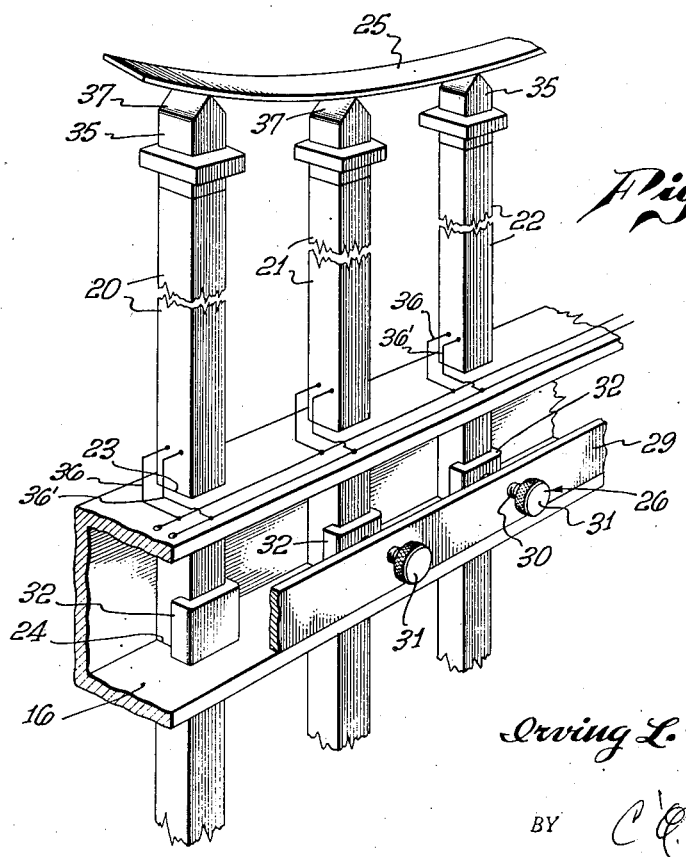
Irving L. Pressman,
INVENTOR.
BY
ATTORNEY.

Nov. 15, 1949     I. L. PRESSMAN     2,487,944

TEMPLATE

Filed Feb. 12, 1945     2 Sheets-Sheet 2

Irving L. Pressman,
INVENTOR.

BY
ATTORNEY.

Patented Nov. 15, 1949

2,487,944

UNITED STATES PATENT OFFICE 2,487,944

TEMPLATE

Irving L. Pressman, Los Angeles, Calif.

Application February 12, 1945, Serial No. 577,473

4 Claims. (Cl. 33—176)

My invention relates to the shaping art and has particular reference to a device which can be applied against an object of irregular contour so as to take the contour of the object and hold it after the object has been removed so that material can be cut or shaped to the same contour of the object by following the line established by the device.

When objects of relatively large area having a somewhat irregularly shaped contour are to be reproduced by conventional means, a reproduction is customarily made by fabricating a series of templates which conform to the contour of successive sections of the object. If the object is especially irregular a great many separate and individual templates must be cut to approach as nearly as possible the true contour of the object. The cutting of templates is expensive and furthermore, leaves room for error each time a template is cut. Consequently, the greater the number of individual templates which must be cut, the greater the probability is for error in reproducing the contour of the original object. The number of templates, for example, necessary to correctly trace the contour of an aircraft wing or aircraft fuselage is considerable. If, however, a reduction in the expense of making many templates is to be effected, the device which takes the place of the templates must be of relatively simple and inexpensive construction and capable as nearly as possible of universal application.

It is therefore among the objects of my invention to provide a new and improved adjustable template containing a series of cooperable, individual elements which can be applied against an irregularly contoured surface and be made to follow the surface exactly and to hold the shape of the surface after the object has been removed.

Another object of my invention is to provide a new and improved template device which can be quickly and efficiently applied to an irregularly contoured surface with a minimum expenditure of time and without the necessity of using skilled craftsmen.

Still another object of my invention is to provide an adjustable template for following the contour of irregular objects wherein a series of mechanical means can be applied against the surface and which will automatically take the contour of the surface without it being necessary to make subsequent adjustments to be certain that the true contour is carried by the template.

Still another object of my invention is to provide a contour-following device for irregular surfaces which, after being applied to the surface, will hold the contour of the surface for an indefinite length of time during which time the device may be used as a pattern for reproducing on another material the contour of the original object, there being contemplated among the objects some fastening means by which an element following the contour may be securely held at all times to the adjusting media.

With these and other objects in view, my invention consists in the construction, arrangement and combination of the various parts of my device whereby the objects contemplated are attained, as hereinafter more fully set forth, pointed out in my claims and illustrated in the accompanying drawings, in which:

Fig. 1 is a side elevational view of my device showing the parts set to follow an arbitrary contour line by way of example.

Fig. 2 is a detailed view in perspective of some of the contour-following, extending means which are illustrated in Fig. 1.

Where speed of production is a factor, it is highly advantageous to have some contour-following device which can be applied against almost any type of external curvature of an object so as to be able to accurately reproduce that curvature in order that the original object may be reproduced in its true form from other material. A template, of course, serves as a type of pattern by means of which any number of additional objects can be made following the same contour as the original object used as a basis for the pattern. If a strip of material is to be used to conform with the contour of an object, devices are required to be fastened to the strip so that when moved endwise to and against the object they are capable of either pushing the contour-following object against the object or withdrawing it therefrom independently of all the other such devices so that the mechanism conforms in true shape and size to the original object. An endwise thrust is necessary in order to force a contour-following strip into its true position and for this reason a rather special connection must be made to the side of the contour-following strip remote from the object so that the strip can be either pushed or pulled at will and so that if the strip is deformed into curves of different types, the strip may be permitted to shift endwise in order to accommodate itself simultaneously to both the contour of the object and its relative location in the template.

Figure 3:
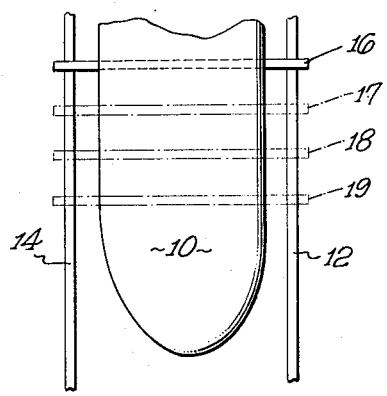
Fig. 3 shows the relative location of a number of settings of the contour means as used to trace the contour of the wing of an airplane.

To accomplish the desired result, there is shown in a device embodying one modification of my invention a frame of a rather open construction which, as shown in Figs. 1 and 3 by way of example, is designed to permit following the contour of an aircraft wing 10. The frame thus referred to comprises a pair of side elements 12 and 14 illustrated as channels which extend throughout the length of the portion of the object of which a contour is to be taken. In Fig. 3 they are shown parallel, one on each side of aircraft wing, and are designed to extend throughout the entire length of the section of the wing which is to be measured for contour.

Supports 16 extend from one side element to the other overlying or underlying the wing section which is to be measured and can be moved successively to positions 17, 18, 19, etc. as desired. More than one support may be used, if desired, for more rapid work in measuring the contour of a large area. The support illustrated in Fig. 1 is a structural member which rests upon the side elements of the frame and may be clamped thereto by a suitable clamp 50.

Mounted upon the support are a series of extensions 20, 21, 22, etc., which have relatively square sides and which pass through squared apertures 23 and 24 in the legs of the channel and fit sufficiently loosely so that the extensions can be moved freely up and down. At each end of the support are retaining members 51, 52 which are mounted upon the supporting member and transverse thereto and extend outwardly along the side of the object of which the contour is to be measured. In this position they form an anchor against sidewise thrust of a contour-following strip 25. It will be noted that the retaining elements 51, 52 extend upwardly a distance sufficient to engage the edges of the resilient strip in many different adjustments without permitting the strip to shift endwise out of position.

Figure 4:
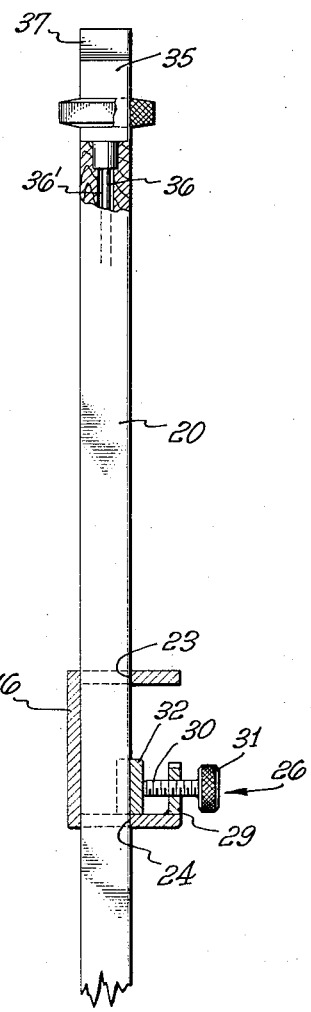
Fig. 4 is a detailed view of the contacting end of one contour-following element showing a preferred type of holder for retaining a contour-following strip.

For moving the strip into its proper position against a contoured surface, the extensions as illustrated in both Figs. 2 and 4 are slidably mounted in the channel comprising the support member and are additionally provided with a clamp device indicated generally by the character 26 so that the extension may be slid rather gradually into its proper position and there fixed while one particular setting is being reproduced.

Since the extensions are freely slidable in apertures 23 and 24 of the supporting channel, some means must be provided to lock or fix them in position once the desired position has been reached. To accomplish this there is provided an outwardly extending bracket 29 on one of the legs of the channel-shaped supporting member. Into this bracket is threadably mounted a screw 30 having a handle 31. At the inside end of the screw is a plate 32 against which the screw bears and which in turn is adapted to be pressed against the side of the support. When it is desired to slide the extension up or down, the screw is loosened to permit more or less frictional resistance against the sliding. When the extension has reached its proper position the screw can be tightened so as to lock the extension in the proper position.

The tops of the extensions are all designed to bear against the strip 25. The ends are furthermore constructed so that they may not only push against the strip 25 but may also pull upon the strip whenever it is necessary to change the direction of curvature of the strip by moving the strip outwardly away from the object and toward the extensions.

One means for holding the strip is illustrated in Figs. 2 and 4 and comprises an electromagnet of conventional construction housed within a casing 35 mounted upon the outer end of each extension. The electromagnet within the housing may be of conventional construction having conductor wires 36 and 36' extending inwardly through the extension to a source of electric current. It has also been found good practice to make the outside end 37 of the electromagnet of such material as is capable of permitting magnetic flux to pass freely through it and which is further capable of making an accurate contact with the contour-following strip. As shown, the end of the electromagnet is in the form of a wedge or triangular prism having an edge transverse to the strip 25, whereby said strip may readily bend about such edge. Details of the electromagnet have not been included because of it being of a relatively conventional structure. The strip 25 in cases where electromagnets are used at the ends of extensions must be of a magnetic material.

Figure 5:
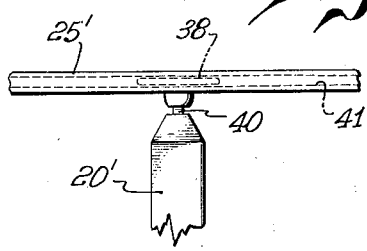
Fig. 5 shows a partial side elevational view of a modified type of holder.
Figure 6:
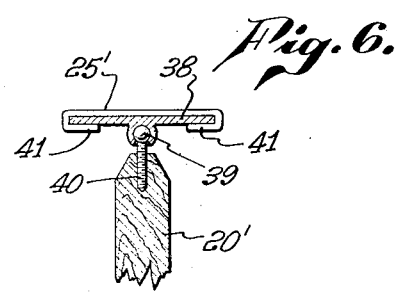
Fig. 6 shows a cross-sectional view of the modified type of holder illustrated in Fig. 5.

In a modified form of my device shown in Figs. 5 and 6 is an alternate type of holder on the end of the extension for retaining a strip 25'. The holder is mounted on the end of the extension in the same general manner as the magnet previously described. The holder consists of a flat shoe 38 which has a universal ball and socket connection 39 to a shaft 40 which in the drawing is shown threadably engaging the end of an extension 20'.

In this particular modified form the strip 25' must have lateral edges extending initially outwardly to form a strip having a width greater than that which will eventually be used. The outwardly extending edges are then given a bend 41 as shown in Fig. 6 in order that they may be bent around the sides and around the underside of the shoe 38. Since this clamping effect of the strip upon the shoe is only in one direction, namely a direction which prevents relative lateral movement between the shoe and the strip, it is desirable to retain some freedom of movement longitudinally with respect to the strip. The limited longitudinal movement becomes necessary when the strip is bent considerably and must shift its position to accommodate itself to the contour. The bends tend to shorten the apparent length of the strip and the end portions must therefore move toward the center.

Figure 7:
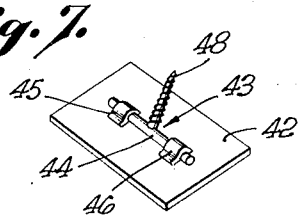
Fig. 7 is still another modified type of holder.

Still another modified form of my invention shown in Fig. 7 consists of a shoe 42 which has a flat upper face similar to the shoe shown in Figs. 5 and 6. Instead of a ball and socket joint, a hinge construction is resorted to. The hinge construction comprises a T-shaped member generally indicated by the numeral 43 wherein a rod element 44 is held against the shoe 42 by means of cut-out fingers 45 and 46. These cut-out fingers are bent over the rod-like cross piece and permit a swinging or pivotal motion with respect to the shoe. A threaded shaft 48 extends in a direction transverse to the rod-like cross piece and is designed to be screwed into the outer end of each of the extensions, the same as the threaded portion of the ball and socket joint shown in Fig. 6. A strip similar to the strip 25' may be fastened to the hinge-equipped shoe 42 by clamping it around the sides. The strip has the same slight freedom of movement longitudinally with respect to the shoe 42. The variation in movement of the strip connected to the shoe 42, however, is more restricted than that of the strip connected to the shoe 38. By reason of having a universal connection, the shoe 38 can tilt laterally at well as longitudinally with respect to the strip, thereby enabling a strip which may be relatively wide to follow a contour in either of two directions, or, in fact, directions inbetween as well. The hinged shoe shown in Fig. 7 may preferably be made of a resilient material which will follow a contour by bending in one direction or another and this permits the shoe to be substantially flat against the contour surface.

Similarly the shoe 38 may likewise be of resilient material so that it may bend in all directions about the ball and socket joint.

The strip 25 shown and described in connection with Figs. 2 and 4 may be permitted some lateral tilt because of the fact that the magnetic force will continue to be effective even though there is no actual contact between the parts. The strip is thereby permitted to tilt laterally while continuing to be held in position by the magnet.

In operation for measuring the contour of an airplane wing, for example, as shown in Fig. 3, the side elements of the frame are placed along the sides of the wing. A supporting element is then placed upon the side elements of the frame extending from one side to another of the wing. The general setup of the side elements of the frame and the supporting member together with the extensions is best shown in Fig. 1. Presuming, in Fig. 1, that a plane wing lies immediately above the strip 25 and has a special contour, the strip may be pushed against the surface of the wing by manipulation one after another of the extensions 20, 21, 22, etc. The extensions toward the middle of the figure will be moved upwardly or outwardly a greater distance than the extensions nearer the ends. The series of extensions each having a movement endwise of a slightly different degree from the next adjacent extension will cause the strip to take the curved form shown in the figure, provided that is the curved form of the wing section to which the template is applied. Once the strip 25 has been given the proper curvature by being forced against the surface of the wing, or in some cases withdrawn therefrom, the extensions can be locked in place by manipulation of the screws 30. Because the strip is permanently retained upon the electromagnets at the ends of the extensions as long as desired, the strip will bend and take the shape of the contour of the wing and will hold that contour just as long as current is maintained to energize the magnets and the extensions remain in their adjusted positions.

With the strip 25 thus given the shape of the contour of an airplane wing, it can be used as a guide for cutting material to conform to the shape and size of the airplane wing or perhaps of constructing a second identical with the first.

By reason of the fact that the template can be varied to fit contours of relatively wide limits, the same template can be used successively, first in position 16, then in position 17, then in 18, 19, etc.

The modified types of holders shown in Figs. 5 and 6 and in Fig. 7 when applied to the ends of the extensions permit use of the device in the same manner as described in connection with the first form.

There has thus been provided a template of a type which is universally adjustable enabling it to follow irregular contours in different directions. The parts can be readily and easily adjusted so as to follow the contours and then locked in adjusted position until some reproduction may be made of the shape of the contour thus reproduced.

I claim:

1. In a contour template device provided with a rigid frame, a plurality of independently movable, transversely extending, extension members carried by the frame in spaced relation and means for adjustably positioning such extension members, the combination of: an electromagnet carried by the end of each of the extension members and a strip of flexible magnetic material in contact with said electromagnets, the contour of said strip depending upon the position of the extension members.

2. In a contour template device provided with a rigid frame, a plurality of independently movable, transversely extending, extension members carried by the frame in spaced relation and means for adjustably positioning such extension members, the combination of: an electromagnet carried by the end of each of the extension members, each of said electromagnets being provided with a wedge-shaped terminal portion presenting an edge transverse to the frame and a strip of flexible, magnetic material in contact with said transverse edges of said electromagnets, the contour of said strip depending upon the position of the extension members.

3. A contour template device including spaced, parallel frame members, a transverse member connecting said frame members and adjustable longitudinally thereof, a plurality of independent, movable extension members carried by the said transverse member, the said extension members being disposed at substantially right angles to said transverse member and arranged in parallel relation one with the other, an electromagnet carried by the end of each extension member, a strip of flexible, magnetic material in contact with said electromagnets, and stop means for preventing endwise movement of said flexible strip.

4. A contour template in accordance with claim 3, wherein each of said electromagnets terminates in a wedge-shaped terminal portion, presenting an edge transverse to said flexible strip, whereby said strip may be readily bent about such edge in response to adjustment of said extension members.

IRVING L. PRESSMAN.

REFERENCES CITED

The following references are of record in the file of this patent:

UNITED STATES PATENTS

| Number | Name | Date |
| --- | --- | --- |
| 1,054,109 | Gasparich | Feb. 25, 1913 |
| 1,328,538 | Newberg et al. | Jan. 20, 1920 |
| 1,367,924 | Sibley | Feb. 8, 1921 |
| 1,642,232 | Edwards | Sept. 13, 1927 |
| 1,670,456 | Lange | May 22, 1928 |
| 1,778,481 | Boncher | Oct. 14, 1940 |

FOREIGN PATENTS

| Number | Country | Date |
| --- | --- | --- |
| 745,101 | France | May 5, 1933 |